Aug. 17, 1948. P. M. WAITE 2,447,444
GROUND STAKE
Filed June 19, 1945

Inventor
P. M. Waite
By Kimmel & Crowell Attorneys

Patented Aug. 17, 1948

2,447,444

UNITED STATES PATENT OFFICE 2,447,444

GROUND STAKE

Philip M. Waite, Corry, Pa.

Application June 19, 1945, Serial No. 600,330

1 Claim. (Cl. 189—91)

This invention relates to a ground stake or anchoring member.

An object of this invention is to provide an improved ground stake or anchoring member which is formed of relatively rigid wire or rod which is bent upon itself and has one reverted portion thereof twisted about the other and forming a screw thread so that the device may be threaded into the ground.

Another object of this invention is to provide a device of this kind which will cut its own opening in the ground and which, during the insertion thereof, will not disturb the ground about the hole formed thereby so that the device will be firmly anchored within the ground.

A further object of this invention is to provide a ground stake or anchoring member of this kind which is simple in construction, and which, due to the simple construction thereof, will not separate during the positioning of the device in the ground.

With the foregoing objects in view, and others which may hereinafter more fully appear, the invention consists of the novel construction, combination and arrangement of parts, as will be more specifically described, and illustrated in the accompanying drawings, wherein are shown embodiments of this invention, but it is to be understood that changes, variations and modifications may be resorted to which fall within the scope of the invention, as claimed.

Figure 1:
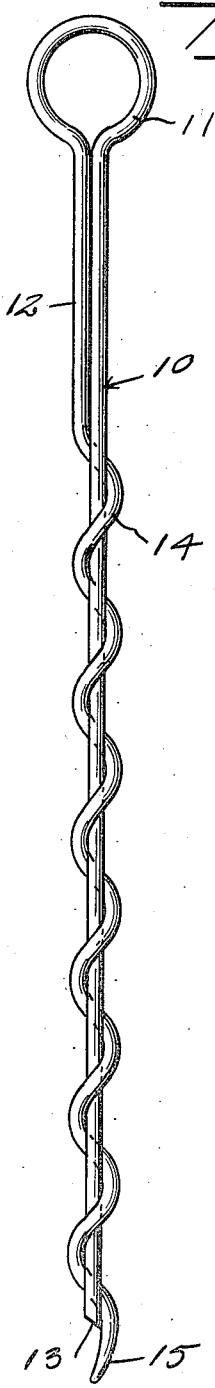
Figure 1 is a detail side elevation of a ground stake or anchor member constructed according to an embodiment of this invention.
Figure 2:
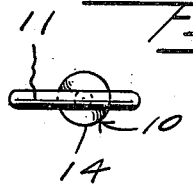
Figure 2 is a top plan view of the device.

Referring to the drawings the numeral 10 designates generally an elongated straight bar which is of suitable length, and thickness, to provide the necessary rigidity. The bar or shank 10 is formed with a beveled lower end 13, and the upper end of the bar or shank 10 is looped, as at 11, so as to form a handle or eye. The bar 12 extends downwardly from the eye 11, in parallel relation to the shank 10, being extended straight downwardly for a suitable distance and the bar 12 is then spirally twisted about the shank 10, as indicated at 14. The spiral portion 14 forms a deep pitch thread about the shank 10, and spiral member 14 terminates at a point below the lower end 13 of the shank 10 as indicated at 15.

The lower end 15 of the thread member 14, is formed as a blade which is adapted to cut its way into the ground as the device is threaded thereinto.

Figure 3:
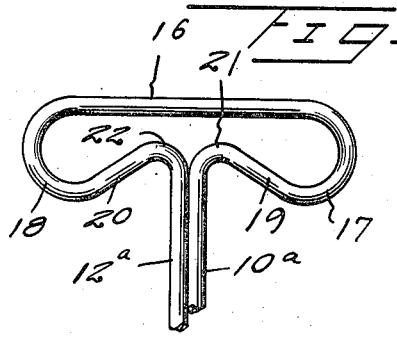
Figure 3 is a fragmentary side elevation of a modified form of handle or upper end.

Referring now to Figure 3 there is disclosed a modified form of handle or eye structure wherein the shank members 10a and 12a have formed on the upper ends thereof, an elongated handle including a straight upper bar 16, which is reverted at the opposite ends thereof to form outer loops 17 and 18 connected to the upper ends of the shank members 10a and 12a by connecting bars 19 and 20. The connecting bars 19 and 20 are downwardly bent at their inner ends, as indicated at 21 and 22, so as to provide substantially ovoidal loops outwardly from the shank members 10a and 12a.

Figure 4:
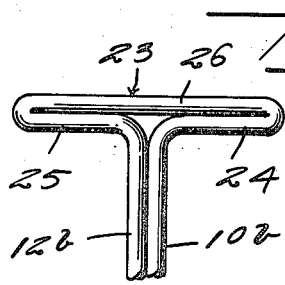
Figure 4 is a fragmentary side elevation of another modified form of handle or upper end.

Referring now to Figure 4 there is disclosed another modified handle structure wherein the handle, generally designated as 23, is formed integral with the upper ends of the shank members 10b and 12b. The upper ends of the shank members 10b and 12b are bent outwardly at substantially right angles, as indicated at 24 and 25 and the ends of the right angular extensions 24 and 25 are reverted sharply so as to provide an elongated straight bar 26. The bar 26 is in substantial contact with the extensions 24 and 25.

In the use of this invention the anchoring member hereinbefore described is formed of relatively rigid wire which is bent upon itself as shown in Figure 1, with one of the reverted portions being partially twisted about the other portion which constitutes the shank or root of the thread. The device is inserted in the ground by a threading operation, and due to the cutting bill 15, at the lower end of the device, the anchoring member will cut its way into the ground without loosening the dirt about the hole as it descends into the ground. The spiral portion 14 will firmly anchor the device at the desired depth in the ground, and will prevent any pulling of the device from the ground so that a firm anchor or ground stake will be provided.

What is claimed is:

An improved ground stake comprising an elongated length of substantially rigid wire bent upon itself to form an elongated straight bar, a beveled end on said bar, a second bar having a straight upper portion, the remaining portion of said second bar spirally wound about said first bar and terminating in a cutting bill below the beveled end of said first bar, the lower end of said cutting bill disposed in substantial alignment with said beveled end, the convolutions of said spiral bar engaging the straight bar along the length of said spiral bar forming longitudinally spaced apart ridges about said straight bar, the straight upper portion of said spiral bar engaging the upper portion of said straight bar and a connecting bar between the upper portions of said straight and spiral bars.

PHILIP M. WAITE.

REFERENCES CITED

The following references are of record in the file of this patent:

UNITED STATES PATENTS

| Number | Name | Date |
|---|---|---|
| 907,799 | Hawley | Dec. 29, 1908 |
| 1,562,343 | La Bore | Nov. 17, 1925 |
| 1,676,468 | Waterman | July 10, 1928 |

FOREIGN PATENTS

| Number | Country | Date |
|---|---|---|
| 408,608 | Great Britain | Apr. 11, 1934 |